June 8, 1965 L. E. LEIGH ETAL 3,187,774
VALVE ASSEMBLY
Filed Feb. 4, 1963
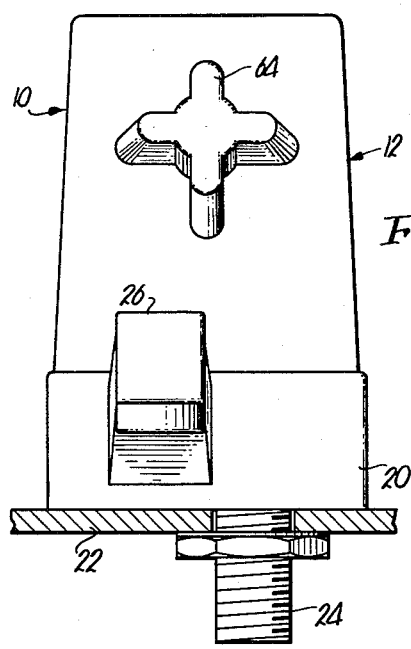
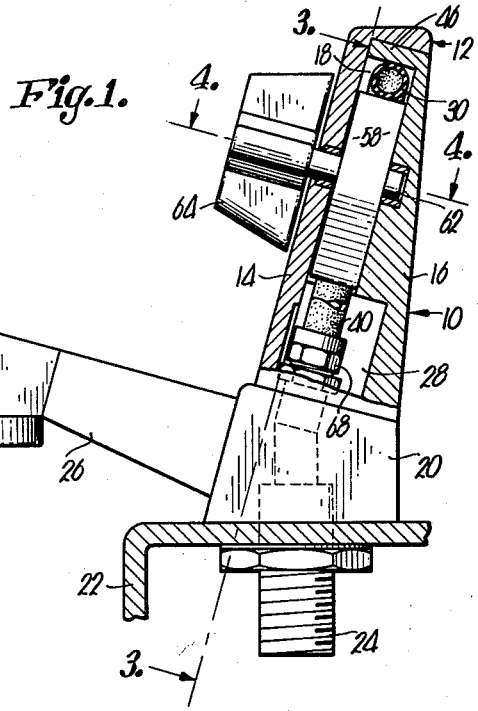
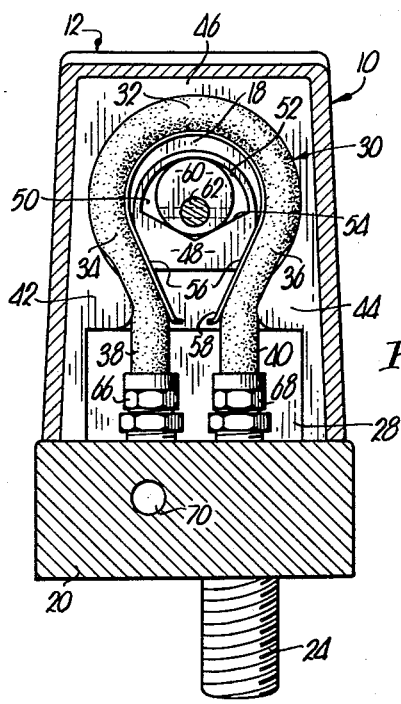
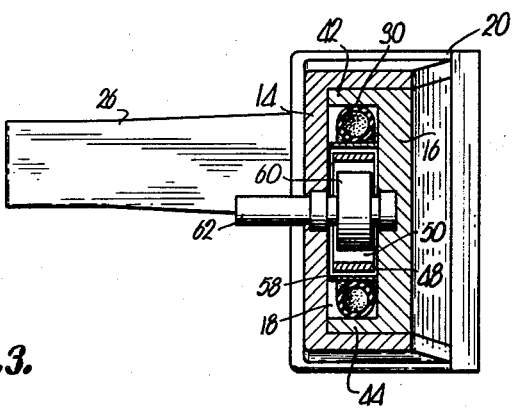
INVENTORS.
Lawrence E. Leigh
BY Drexel T. Carlson
ATTORNEYS.

United States Patent Office 3,187,774
Patented June 8, 1965

3,187,774
VALVE ASSEMBLY
Lawrence E. Leigh, 8402 Marty, Overland Park, Kans., and Drexel T. Carlson, Kansas City, Mo.; said Carlson assignor to said Leigh
Filed Feb. 4, 1963, Ser. No. 255,914
7 Claims. (Cl. 137—614.11)

This invention relates to a valve assembly and, more particularly, to such an assembly that may be utilized in conjunction with household faucets and other plumbing equipment whereby to insure positive control over the flow of fluid through such plumbing fixtures.

It is the primary object of this invention to provide a valve assembly having a body which defines a cavity, there being a loop of flexible, fluid-carrying material disposed within said cavity, and a block shiftably carried therein whereby to compress said loop and thereby terminate the flow of fluid therethrough.

It is yet another primary object of this invention to provide a valve assembly which may be interposed in existing plumbing systems and the like, and which may be utilized as a faucet having a minimum number of parts and which eliminates the requirement of packing washers and the like which are normally associated with the present conventional faucets utilized as a part of household plumbing and in other areas.

It is yet further aim of this invention to provide a valve assembly which may be interposed in a fluid-carrying line between an inlet and an outlet through the means of suitable adaptor couplings, the said adaptor couplings connecting the free ends of the flexible, fluid-carrying, U-shaped tube which is received within the cavity of the body with an inlet and outlet, there being a block which moves against the U-shaped tube whereby to compress the legs thereof at opposed points and thereby terminate the flow of fluid through the tube.

Yet another aim of this invention is to provide a valve assembly having a body composed of a pair of plates which cooperate to define a cavity, the rearmost of said plates having a slot therein in communication with said cavity, the cavity receiving therewithin a U-shaped, flexible, fluid-carrying tube and a block, shiftably mounted and operable by a cam, which block may be moved from a position in and out of engagement with the legs of said U-shaped tube.

A yet further aim of the present invention is to provide a valve assembly wherein the shiftable block has an opening therethrough, the opening having an arcuate top edge and a V-shaped bottom edge, there being a cylindrical cam disposed within said opening which is rotatable by means of a shaft whereby the cam may cause the block to be shifted into compressing engagement with the legs of the tube, there being a U-shaped compression plate disposed between said block and the legs of said tube.

Other objects of the present invention will become apparent from the following specification and accompanying drawing, wherein:

FIGURE 1 is a longitudinal, sectional view of a faucet embodying the present valve assembly;

FIG. 2 is a front elevational view of said faucet;

FIG. 3 is a sectional view taken on line 3—3 of FIG. 1; and

FIG. 4 is a sectional view taken on line 4—4 of FIG. 1.

This is a continuation-in-part of application Serial No. 158,813, filed December 12, 1961, and entitled "Valve Assembly," now abandoned.

The valve assembly, broadly designated as 10 has, as its primary components, a body 12 which may be formed from metal or a suitable plastic, the body 12 being formed essentially from a front body plate 14 and a rear body plate 16, said plates 14 and 16 cooperating to define a cavity 18. The plates 14 and 16 of body 12 are mounted upon a suitable base 20 which is in turn mounted upon a lavatory or the like 22 provided with suitable connections to a source of fluid supply such as piping 24. Base 20 has as a part thereof, a faucet 26 which forms the fluid outlet and delivers the fluid passing through the valve assembly 10 into a suitable receptacle or the like. Back plate 16 of body 12 has a transverse slot 28 formed therein, which slot 28 is in communication with a cavity 18 as best shown in FIGS. 1 and 3 of the drawing.

A substantially U-shaped, flexible, fluid-carrying tube 30 is disposed within the cavity 18 and may be formed from rubber, plastic or any other suitable material which is subject to compression whereby to terminate the flow of fluid therethrough. The tube 30 is in the form of a U-shaped loop whereby to present a bight portion 32 and a pair of legs 34 and 36, said legs having free ends 38 and 40, respectively, said free ends being disposed substantially within slot 28 of back plate 16.

Back plate 16 has a pair of opposed, normally forwardly extending extensions 42 and 44 which define the outer edges of the cavity 18 adjacent the legs 34 and 36 of tube 30, and a normally uppermost, forwardly projecting extension 46 which defines the upper edge of cavity 18 which is proximal to bight 32 of tube 30.

A shiftable block 48 is carried within cavity 18, the block 48 having an opening 50 formed therethrough, which opening has an arcuate top edge 52 and a V-shaped bottom edge 54. The edges of block 48 which are proximal to the legs 34 and 36 of tube 30 are beveled as at 56 whereby to place the same in substantially parallel relationship to the opposed portions of extensions 42 and 44, respectively.

A U-shaped compression plate 58 is also carried within the cavity 18 and is disposed between the block 48 and the tube 30. It will be appreciated that extensions 42, 44 and 46 of back plate 16 and block 48 and compression plate 58, cooperate to retain the U-shaped tube 30 within the desired position in cavity 18.

A cylindrical cam 60 is carried within the opening 50 of block 48 and is rotatable by a shaft 62, which shaft, as best shown in FIG. 1 of the drawing, is suitably journaled in back plate 16 and front plate 14 whereby the same may be rotated as by an operating knob 64 disposed exteriorly of body 12.

The free ends 38 and 40 of tube 30 are connected, as by couplings 66 and 68 respectively, with outlet and inlet piping. Thus, free end 40 of tube 30 is connected, by coupling 68, with an extension of pipe 24 which may assume any suitable configuration whereby fluid which is delivered into the plumbing system of a house or the like, will pass through pipe 24 and thence into the fluid carrying tube 30. The free end 38 of tube 30 is connected, as by coupling 66, to an outlet 70 which is in turn in communication with the faucet 26 whereby, when the valve assembly 10 is in an open condition, fluid may pass from pipe 24 through the valve assembly 10 and out of faucet 26.

As is apparent from the foregoing, there is provided a valve assembly 10 which is simple in construction yet positive in its action and operation. The major components of the assembly 10 may be formed from either plastic or metal as is desired, it being contemplated that the tube 30 will be of a plastic material sufficient to withstand various ranges of temperature in the fluids that pass therethrough. As is further evident, the valve assembly 10 may be quickly interposed within an existing piping or plumbing system by means of couplings 66 and 68 which, as is obvious, may be of any size at their internally threaded portions whereby the assembly 10 can be accommodated to any pipe regardless of its diameter.

Once the valve assembly 10 has been interposed in a piping system, fluids may pass thereinto by means of a pipe such as 24 and, with the assembly 10 in its open condition, will continue therethrough and out of outlet 70 and, therefore, faucet 26. However, when it is desired to terminate the flow of fluids through the valve assembly 10, the operating knob 64 is rotated whereby to cause, by shaft 62, the rotation of cylindrical cam 60, said rotation causing the eccentrically mounted cam 60 to move into engagement with the block 48, and particularly walls 52 and 54 thereof, whereby to cause the downward movement of said block, viewing FIG. 3, and thereby the simultaneous compression of legs 34 and 36 of the tube 30. The compressing action upon the legs 34 and 36 is accomplished through the beveled edges 56 of block 48 moving into engagement with the legs of compression plate 58 whereby to cause said legs, under pressure by said block, to squeeze the legs 34 and 36 of tube 30 against the proximal portions of extensions 42 and 44 of back plate 16, which extensions define the outer wall of the cavity 18.

As is obvious, the valve assembly may be returned to its open condition whereby to allow the flow of fluids therethrough merely by further rotation of operating knob 64 which moves the eccentrically mounted cam 60 on to a rest position, thereby allowing the block 48 to move out of engagement with the compression plate 58 and therefore, allowing the expansion of the legs 34 and 36 of the tube 30.

Having thus described the invention, what is claimed as new and desired to be secured by Letters Patent is:

1. A valve assembly comprising a body having a cavity formed therein; a substantially U-shaped, flexible, fluid-carrying tube disposed within said cavity; a block shiftably carried within said cavity, said block having an opening therethrough; a cam within said opening; and a shaft coupled with said cam whereby the latter may be moved into engagement with said block and thereby shift said block to a position of simultaneous compressing engagement with the legs of said tube.

2. A valve assembly as set forth in claim 1, wherein the corners of said block proximal to the legs of said tube are beveled.

3. A valve assembly as set forth in claim 2, there being a substantially U-shaped compression plate interposed between said block and said tube.

4. A valve assembly as set forth in claim 1, said opening having an arcuate top edge and a V-shaped bottom edge, said cam being cylindrical.

5. A valve assembly comprising a body having a cavity formed therein; a substantially U-shaped, flexible, fluid-carrying tube disposed within said cavity; a block shiftably carried within said cavity, said block having an opening therethrough, said opening having an arcuate top edge and a V-shaped bottom edge; a cylindrical cam within said opening and in engagement with portions of said edges; a shaft coupled with said cam for rotating the latter whereby to cause said block to shift to a position of simultaneous compressing engagement with the legs of said tube; and a coupling carried by the free end of each of said legs for placing said tube in communication with a fluid inlet and outlet.

6. A valve assembly as set forth in claim 5, wherein the corners of said block proximal to the legs of said tube are beveled and are substantially parallel to the walls of the cavity opposed thereto.

7. A valve assembly comprising a body formed from a front plate and a back plate, said plates cooperating to define a cavity, said back plate having a transverse slot therein in communication with said cavity; a substantially U-shaped, flexible, fluid-carrying tube disposed within said cavity, the free ends of said tube being within said slot; a block shiftably carried within said cavity, said block having an opening therethrough, said opening having an arcuate top edge and a V-shaped bottom edge; a cylindrical cam within said opening and in engagement with portions of said edges; a substantially U-shaped compression plate interposed between said block and said tube; a shaft coupled with said cam for rotating the latter whereby to cause said block and said compression plate to exert a simultaneous compressing action on the legs of said tube; and a coupling carried by the free end of each of said legs, between said plates and within said slot for placing said tube in communication with a fluid inlet and outlet.

References Cited by the Examiner

UNITED STATES PATENTS

| 579,501 | 3/97 | Smith et al. | 137—614.11 XR |
| 729,423 | 5/03 | Scheiber et al. | 251—9 XR |
| 1,340,828 | 5/20 | Heap | 251—6 |
| 2,568,520 | 9/51 | Smith | 251—260 |
| 2,827,919 | 3/58 | Rice et al. | 251—5 |

FOREIGN PATENTS

| 619,098 | 12/26 | France. |
| 649,146 | 1/51 | Great Britain. |

LAVERNE D. GEIGER, *Primary Examiner.*